United States Patent [19]

Basavanhally et al.

[11] Patent Number: 5,337,384
[45] Date of Patent: Aug. 9, 1994

[54] OPTICAL FIBER CONNECTOR

[75] Inventors: Nagesh R. Basavanhally; Richard Borutta, both of Trenton, N.J.; Edward W. Jekkal, Yardley, Pa.

[73] Assignee: AT&T Bell Laboratories, Murray Hill, N.J.

[21] Appl. No.: 86,580

[22] Filed: Jul. 6, 1993

[51] Int. Cl.[5] .......................... G02B 6/40; G02B 6/38
[52] U.S. Cl. ........................................ 385/54; 156/158
[58] Field of Search ................. 385/31, 39, 53, 56, 385/72, 88, 96, 114, 147; 156/158, 163, 182

[56]  References Cited

U.S. PATENT DOCUMENTS

| 4,725,117 | 2/1988 | Ellis | 385/73 X |
| 4,952,263 | 8/1990 | Kakii et al. | 385/65 X |
| 4,973,127 | 11/1990 | Cannon, Jr. et al. | 385/56 |
| 4,998,796 | 3/1991 | Bonanni et al. | 350/96.21 |
| 5,135,590 | 4/1992 | Basavanhally et al. | 156/64 |

Primary Examiner—Akm E. Ullah
Attorney, Agent, or Firm—Roderick B. Anderson

[57] ABSTRACT

A method for interconnecting first and second optical fiber bundles (FIG. 4), each bundle comprising a plurality of optical fibers, comprises the steps of accurately forming substantially identical matrix arrays of apertures in first and second thin securing plates (FIG. 1, 20, 17). The use of thin plates for the securing plate makes it possible to form apertures by masking and etching with great precision, but the plates themselves have little mechanical strength. The first and second plates are aligned (by balls 24), and a first support member (31), which is mechanically rugged, is simultaneously contacted to the first securing plate (17) and to a first alignment pin (27). The first support member (31) is bonded to the first securing plate while the first securing plate (17) is in alignment with the second securing plate (20). Thereafter, a second support member (29) is simultaneously contacted to the first alignment pin (27) and to the second securing plate (20) and bonded to the second securing plate is it is held in alignment with the first securing plate. Each optical fiber of the first optical fiber bundle is inserted into a first aperture of the first securing plate, and each optical fiber of the second optical fiber bundle is inserted into a first aperture of the second securing plate. After polishing the optical fibers so that they are each in a common plane with a surface of the securing plate to which it is attached, the two securing plates are abutted (FIG. 4). The first (31) and second (29) support members are simultaneously contacted to a common alignment pin (53), thereby to align the first and second securing plates along with the two contained optical fiber bundles (38, 49). By attaching the support members (29, 31) to the two securing plates when they are in alignment, one provides mechanical strength to the two securing plates while assuring that later alignment of the support members aligns the component fiber of the optical fiber bundles.

18 Claims, 3 Drawing Sheets

OPTICAL FIBER CONNECTOR

TECHNICAL FIELD

This invention relates to optical fibers and, more particularly, to methods for connecting optical fiber bundles.

BACKGROUND OF THE INVENTION

The patent of Basavanhally et al., U.S. Pat. No. 5,135,590, granted Aug. 4, 1992, hereby incorporated herein by reference, describes a method for arranging the ends of component fibers of an optical fiber bundle into a matrix configuration. The patent points out that a precisely accurate matrix configuration is required, for example, for free-space photonics switching. Optical fiber bundles are also used in other communication equipment for the parallel transmission of large quantities of information in the form of light.

Various techniques have been described for splicing individual optical fibers, that is, abutting successive fibers at their ends with sufficient precision that light can be transmitted through the juncture. One can appreciate that individual splicing of component optical fibers of an optical fiber bundle is time consuming, and adds to the bulk of optical fiber bundles. The U.S. Pat. No. 4,998,796, of Bonanni et al., granted Apr. 4, 1991, describes optical fiber connectors that can be used to splice the fibers of two optical fiber ribbons. The array of fibers spliced extends in only one direction, rather than two directions, as is true of optical fiber bundles. Accordingly, there is a long-felt need in the industry for a method for conveniently splicing or interconnecting abutting optical fiber bundles, each comprising a plurality of light transmitting optical fibers, with sufficient precision that information-containing lightwaves can be efficiently transmitted through each juncture.

SUMMARY OF THE INVENTION

In accordance with an illustrative embodiment of the invention, a method for interconnecting first and second optical fiber bundles, each bundle comprising a plurality of optical fibers, comprises the steps of accurately forming substantially identical matrix arrays of apertures in first and second thin securing plates. The use of thin plates for the securing plate makes it possible to form apertures by masking and etching with great precision, but the plates themselves have little mechanical strength. The first and second plates are aligned, and a first support member, which is mechanically rugged, is simultaneously contacted to the first support member and to a first alignment pin. The first support member is bonded to the first securing plate while the first securing plate is in alignment with the second securing plate. Thereafter, a second support member is simultaneously contacted to the first alignment pin and to the second securing plate and bonded to the second securing plate as it is held in alignment with the first securing plate. Each optical fiber of the first optical fiber bundle is inserted into a first aperture of the first securing plate, and each optical fiber of the second optical fiber bundle is inserted into a first aperture of the second securing plate. After polishing the optical fibers so that they are each in a common plane with a surface of the securing plate to which it is attached, the two securing plates are abutted. The first and second support members are simultaneously contacted to a common alignment pin, thereby to align the first and second securing plates along with the two contained optical fiber bundles. By attaching the support members to the two securing plates when they are in alignment, one provides mechanical strength to the two securing plates while assuring that later alignment of the support members aligns the component fiber of the optical fiber bundles.

At least one guiding plate member is preferably used with each securing plate, in accordance with the principles described in the Basavanhally et al. patent, to aid in insertion of the optical fibers into the apertures of the securing plate. A fixture will be described for allowing two support members to be abutted against two alignment pins prior to bonding to each of the securing plates. Thus, in a preferred embodiment, each securing plate includes two opposite support members for giving mechanical strength during the alignment process. Each of the two bundles is mounted in a connector member having a projecting alignment pin. When the two bundles are brought into alignment, the pin from one connector member engages a spring-loaded receptacle of the other connector to assure alignment of the two abutting securing plates.

It can be appreciated that a single package for joining two bundles is more compact and is easier to implement than individual packages for splicing each individual optical fiber. Further, the invention lends itself well to the arrangement of optical fibers as described in the Basavanhally et al. patent. That is, if desired, the mounted fiber ends can be used to project light for free-space switching. These and other objects, benefits and advantages of the invention will be better understood from a consideration of the following detailed description taken in conjunction with the accompanying drawing.

DETAILED DESCRIPTION

The aforementioned Basavanhally et al. patent describes a method for securing the ends of an optical fiber bundle into a matrix configuration by first photolithographically forming apertures in a securing plate and a guiding plate. A linear array of optical fibers is then inserted by a special tool such that each fiber projects first through an aperture of the guiding plate into an aligned aperture of the securing plate. In one embodiment, the fibers may project through the securing plate and may be bonded into position using, for example, epoxy. After the fibers have been secured in position, the ends projecting from the securing plate are polished, thereby leaving a matrix array configuration to the optical fiber ends that are coincident with a surface of the securing plate. The present invention makes use of these principles for fixing the ends of an optical fiber bundle in a predetermined configuration, and it essentially provides that two such configured bundles can be abutted together so that light energy can flow smoothly from each fiber of one bundle into an aligned optical fiber of the other bundle. The figures illustrate the process schematically; the various elements are not necessarily to scale and have been simplified in the interest of clarity.

Figure 1:
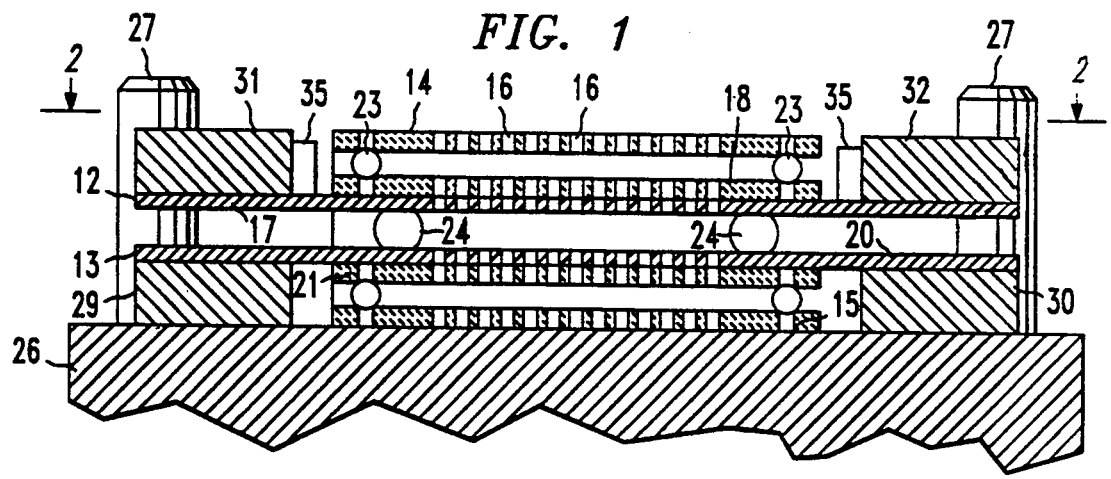
FIG. 1 is a sectional schematic view of one step in interconnecting two optical fiber bundles in accordance with an illustrative embodiment of the invention.
Figure 2:
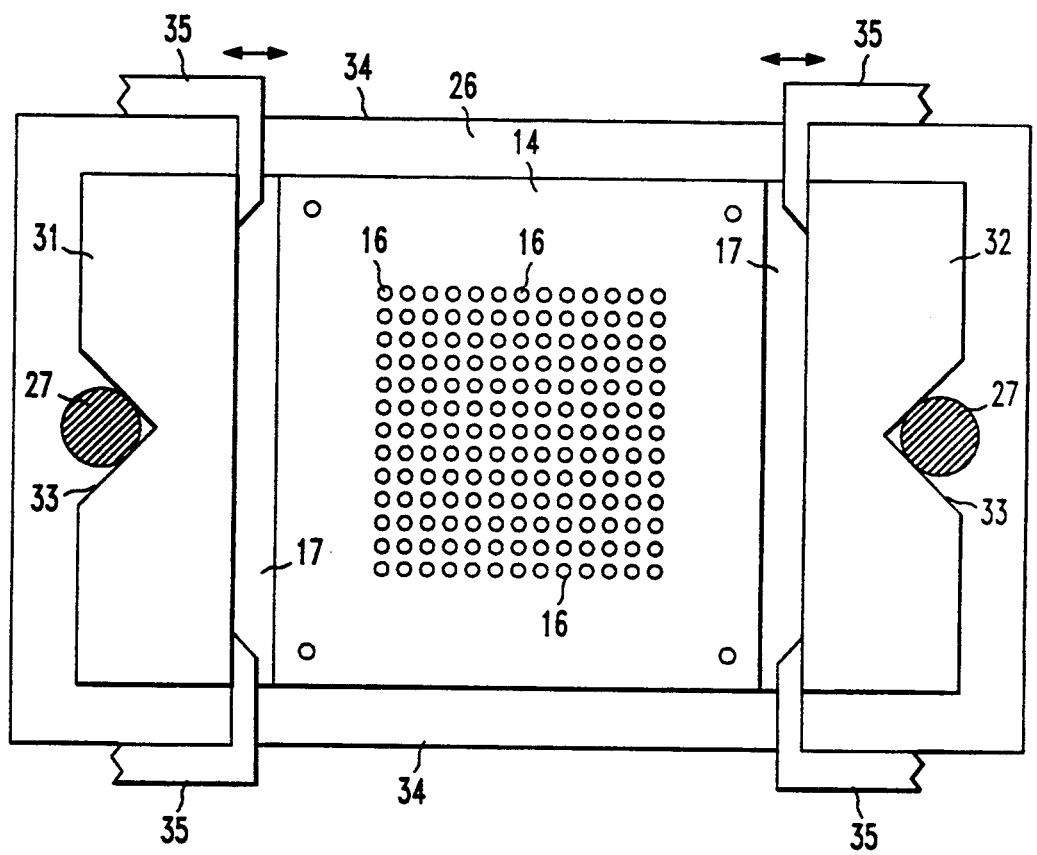
FIG. 2 is a view taken along lines 2—2 of FIG. 1.

Referring now to FIGS. 1 and 2, there is shown apparatus for aligning securing plates so that optical fiber bundles can be aligned, in accordance with an illustrative embodiment of the invention. As in the Basavanhally et al. patent, the first step is to use photolithographic masking and etching to provide an identical matrix array of apertures in two securing plates 12 and 13 and in two guiding plates 14 and 15. The matrix array of apertures 16 in guiding plate 14 is shown in FIG. 2. The securing plate 12 includes a metal portion 17 which is bonded to a ceramic portion 18. Likewise, the securing plate 13 comprises a metal portion 20 bonded to a ceramic portion 21.

The apertures of guiding plate 14 are aligned with the apertures of the ceramic portion of securing plate 12 by means of glass balls 23, which engage apertures of the guiding plate 14 and the ceramic portion 18. As was pointed out in the Basavanhally et al. patent, using alignment balls of slightly larger diameter than engaged apertures is an effective way of aligning apertured members. By the same token, alignment balls 24 are used for vertically aligning securing plates 12 and 13. The assembly rests on a fixture 26 containing two spaced alignment pins 27.

Located adjacent opposite ends of securing plate 13 are support members 29 and 30. These support members are designed to engage alignment pins 27, but at this point are not yet bonded to securing plate 13. Similarly, a pair of support members 31 and 32 are located at opposite ends of securing plate 12 and engage indexing pins 27 by way of V-shaped grooves 33 as shown in FIG. 2.

The fixture 26 describes surfaces 34 (FIG. 2) along which biasing members 35 are adapted to slide in a horizontal direction as shown by the arrows. The biasing members 35 are adapted to engage support members 31 and 32 and to press them against alignment pins 27 as shown. When support members 31 and 32 are firmly pressed against alignment pins 27, the biasing members 35 can be locked into the position shown in FIG. 2. The next step is to bond permanently the support members 31 and 32 to securing plate 12 and to guiding plate 14. This is done by injecting, for example, epoxy into the assembly. After the epoxy has cured, it can be appreciated from FIG. 2 that support members 31 and 32 are bonded in a position separated by a distance determined by the separation distance of alignment pins 27.

Next, the process is repeated for the purpose of bonding support members 29 and 30 to securing plate 13 and guiding plate 15. That is, the assembly shown in FIG. 1 is reversed, so that support members 31 and 32 and guiding plate 14 face the fixture 26, while support members 29 and 30 are in the position shown by support members 31 and 32 of FIG. 1. The location of securing plates 12 and 13 are reversed from that shown in FIG. 1 and are again separated and aligned by alignment balls 24. With the assembly in this position, V-shaped grooves of support members 29 and 30 are biased by biasing means 35 of FIG. 2 against alignment pins 27. With their positions thus fixed, support members 29 and 30 are permanently bonded as by epoxy to securing plate 13 and guiding plate 15. Note that the epoxying step has the effect of permanently bonding alignment balls 23 to the assembly but not the alignment balls 24. The bonding fixes support members 29 and 30 with respect to alignment pins 27 and aligns the securing plate 13 with securing plate 12 because of alignment balls 24.

Figure 3:
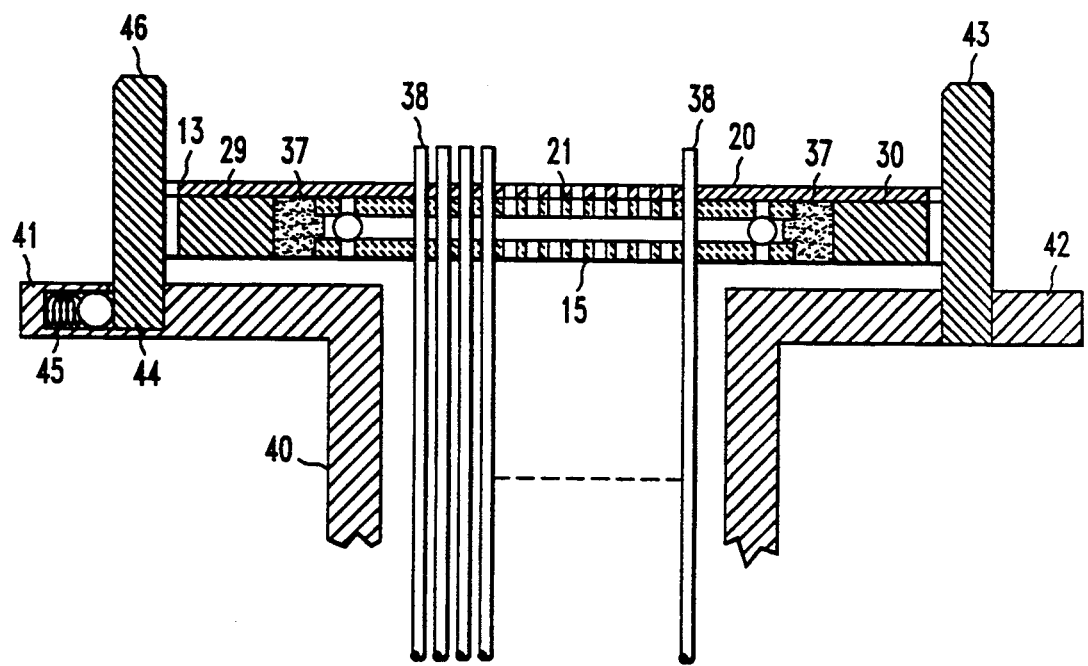
FIG. 3 illustrates a successive step in the interconnection of two optical fiber bundles.

Referring to FIG. 3, there is shown securing plate 13 after the bonding operation, resulting in a hardened epoxy bond 37. The epoxy bond 37 also constitutes a filler which provides mechanical support to the thin metal portion 20 of securing plate 13. Optical fibers 38 are mounted in the aligned apertures of the guiding plate 15 and securing plate 13. An entire linear array of optical fibers may be simultaneously inserted into the apertures using the techniques described in the Basavanhally et at. patent. After insertion, the assembly is contained within a cylindrical connector member 40, having flange members 41 and 42. Extending from a flange member 42 is an alignment pin 43. Flange 41 includes a receptacle 44 and a ball plunger 45. An alignment pin 46 inserted in receptacle 44 is biased by the ball plunger 45. The support members 29 and 30 bear against pins 43 and 46 in the manner shown in FIG. 2. That is, V-shaped portions of the support members bear against the alignment pins.

With the elements assembled as shown in FIG. 3, epoxy is then injected into the interior of connector member 40 to seal the optical fibers in position and to seal the assembly with respect to alignment pin 43. Alignment pin 46 remains removable, but is temporarily left in the position shown to provide stability and alignment until the epoxy is cured. After the optical fibers have been permanently bonded together, pin 46 is removed and the projecting ends of fibers 38 are polished to be flush with the upper surface of securing plate 13. As taught in the Basavanhally et al. patent, alter this procedure, the ends of the optical fibers 38 are precisely located and snugly fitted within apertures of the metal portion 20 of the securing plate 13. Index pin 43 is preferably retractable so that it can be axially moved to be entirely below the surface of metal plate 20 during the polishing operation.

Thereafter, the securing plate 12 of FIG. 2 is likewise assembled with optical fibers within a connector in the same manner as shown in FIG. 3. It too is assembled such that the optical fibers are permanently mounted within a connector member. As taught in the Basavanhally et al. patent, the apertures in metal portion 17 of the securing plate 12 are preferably smaller than the apertures in ceramic portion 18 of guiding members 14 to assure a snug fit for the ends of the fibers.

Figure 4:
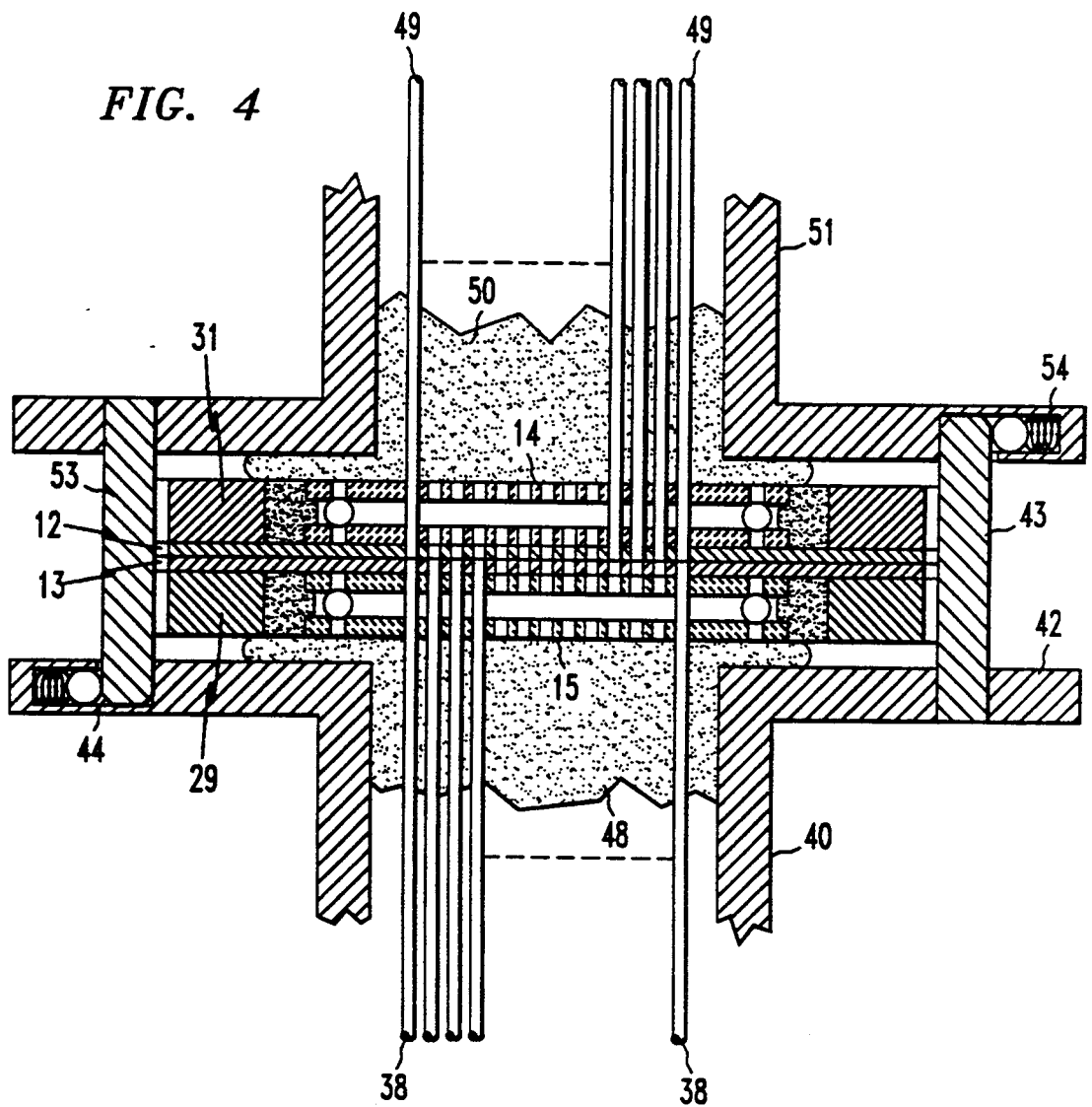
FIG. 4 illustrates a final step in the interconnection of two optical fiber bundles in accordance with an illustrative embodiment of the invention.

FIG. 4 shows the completed connector member 40. The component optical fibers 38 are permanently held in place by epoxy 48. In the same manner, optical fibers 49 are held in place by epoxy 50 in a connector member 51. The optical fibers 50 terminate at securing plate 12, while the optical fibers 38 terminate at securing plate 13. The alignment pin 43 of connector member 40 extends into a receptacle of connector 51, while the corresponding alignment pin 53 of connector 51 extends into receptacle 44 of connector 40. The ball plunger 45 of connector 40 bears against alignment pin 53, while a ball plunger 54 of connector member 51 bears against alignment pin 43. These bias forces on the alignment pins force securing plate 12 into alignment with securing plate 13 and thus aligns optical fibers 38 with optical fibers 49. After alignment as shown, the connectors 40 and 41 can be bolted together for permanent stability by apparatus that has not been shown. Individual fibers are aligned with sufficient precision to permit them to transmit lightwaves across the interface between securing plates 12 and 13 without significant loss.

Referring again to FIG. 1, the metal portion 17 of securing plate 12 is typically only about 75 microns thick. It is chosen to be that thin so that the apertures for holding the optical fibers can be conveniently made in them with great precision by photolithographic masking and etching. However, no compressive force is exerted on the securing element 17 in FIGS. 1 and 2. The only applied forces are on the support members 31 and 32, which are sufficiently thick to withstand such forces. Compressive force is exerted on the securing plates in FIGS. 3 and 4, but at that point, the epoxy 37 provides mechanical reinforcement.

Figure 5:
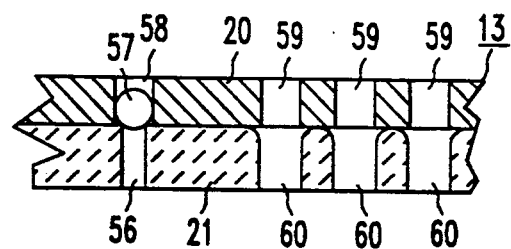
FIG. 5 illustrates a method for assembling the securing plate of FIG. 1.

Referring to FIG. 5, the metal portion 20 of the securing plate 13 is initially bonded to ceramic portion 21 by providing in the ceramic portion an alignment aperture 56 that mounts an alignment ball 57, which is approximately the same size in diameter as an aperture 58 in the metal securing member 20. The aperture 56 may have a diameter of 120 microns, the ball 57 a diameter of 250 microns, and the aperture 58, 252 microns. The apertures 59 in plate 20 for receiving the optical fibers may have a diameter of 126 microns, with a fiber diameter of 125 microns, and aperture 60 in plate 21 may have a diameter of 135 microns. The guiding plate apertures may also be 135 microns in diameter. Several such alignment balls 57 are used to give registration. After bonding to form securing plate 13, it is used as described with reference to FIG. 2. The securing plate 12, comprising metal portion 17 and ceramic portion 18, is preferably assembled in the same manner.

The embodiments described are only illustrative of the inventive concepts involved. It can be appreciated that each connector assembly can be used independently, as described in the Basavanhally et al. patent, or connected to another assembly as shown in FIG. 4. Various other embodiments and modifications may be made by those skilled in the art without departing from the spirit and scope of the invention.

We claim:

1. A method for connecting first and second optical fiber bundles, each bundle comprising a plurality of optical fibers, comprising the steps of:

making first and second securing plates to respectively contain therein substantially identical arrays of first apertures, each first aperture having a diameter sufficiently close to the diameter of an optical fiber to hold in place an end of such optical fiber inserted therein, each array extending in two dimensions;

aligning the first and second securing plates;

simultaneously contacting a first support member to the first securing plate and to a first alignment pin and bonding the first support member to the first securing plate;

thereafter, simultaneously contacting a second support member to the first alignment pin and to the second securing plate, and bonding the second support member to the second securing plate;

inserting each optical fiber of the first optical fiber bundle into a first aperture of the first securing plate and each optical fiber of the second optical fiber bundle into a first aperture of the second securing plate;

and simultaneously contacting the first and second support members to a first common alignment pin, thereby to align the first and second optical fiber bundles.

2. The method of claim 1 wherein:

the first and second securing plates are made of a much thinner material than the material of the support members;

and the support members are made of a sufficiently thick material that they can be forced against the alignment pin without deforming.

3. The method of claim 2 wherein:

the first alignment pin is located on a fixture, a fixed distance from a second alignment pin located on said fixture;

with the first support member in contact with the first alignment pin, a third support member is simultaneously contacted to the first securing plate and to the second alignment pin, and the third support member is bonded to the first securing plate;

with the second support member in contact with the first alignment pin, a fourth support member is simultaneously contacted to the second securing plate and to the second alignment pin, and the fourth support member is bonded to the second securing plate;

the first and second support members are simultaneously contacted to a second common alignment pin at the same time such first and second support members are contacted to the first common alignment pin, thereby to aid further in aligning the first and second optical fiber bundles.

4. The method of claim 3 wherein:

the first common alignment pin is fixed to a first flange that surrounds and is bonded to the first optical fiber bundle, and the second common alignment pin is fixed to a second flange that surrounds and is bonded to the second optical fiber bundle.

5. The method of claim 1 wherein:

the inserting steps cause the optical fibers to protrude through the apertures;

the optical fibers of the first optical fiber bundle are polished to be flush with a first surface of the first securing plate and the second optical fibers are polished to be flush with a first surface of the second securing plate;

and the first and second securing plates are bonded with the first surface of the first securing plate facing the first surface of the second securing plate.

6. The method of claim 1 wherein:

the first and second securing plates are aligned by placing first spheres to contact second apertures of the first and second securing members, the first spheres each having a slightly larger diameter than either of the second apertures it contacts.

7. The method of claim 1 wherein:

the step of bonding the first support member to the first securing plate and the step of bonding the second support member to the second securing plate both comprise the steps of applying sufficient epoxy to the securing plate to significantly reinforce its mechanical strength.

8. The method of claim 1 further comprising the steps of:

making substantially identical guiding plates to respectively contain therein substantially identical arrays of first apertures which are substantially identical to the arrays of first apertures in the first and second securing plates;

and aligning the first and second guiding plates respectively with the first and second securing plates.

9. The method of claim 8 wherein:

the step of inserting each optical fiber comprises the step of inserting such optical fiber first through a guiding plate aperture and then into a securing plate aperture.

10. The method of claim 9 wherein:

the step of bonding the first support member to the first securing plate includes the step of bonding the first securing plate to the first guiding plate;

and the step of bonding the second support member to the second securing plate comprises the step of bonding the second securing plate to the second guiding plate.

11. The method of claim 10 wherein:

the step of aligning the first securing plate to the first guiding plate comprises the step of locating a sphere between the securing plate and guiding plate which is held in place by matching apertures of the securing plate and the guiding plate.

12. The method of claim 8 wherein:

the first and second securing plates are aligned by placing first spheres to contact second apertures of the first and second securing members, the first spheres each having a slightly larger diameter than either of the second apertures it contacts.

13. The method of claim 12 wherein:

the guiding plates and securing plates are made to contain therein identical matching third alignment apertures;

the step of aligning the first guiding plate to the first securing plate comprises the step of contacting the third alignment apertures of the first guiding plate and first securing plate with second alignment spheres each having a slightly larger diameter than either of the third alignment apertures it contacts;

and the step of aligning the second guiding plate to the second securing plate comprises the step of contacting the third alignment apertures of the second guiding plate and second securing plate with third alignment spheres each having a slightly larger diameter than either of the third alignment apertures it contacts.

14. The method of claim 13 wherein:

the step of bonding the first support member to the first securing member includes the step of bonding the first securing plate to the first guiding plate with second alignment spheres permanently held between the first securing plate and the first guiding plate;

and the step of bonding the second support member to the second securing plate comprises the step of bonding the second securing plate to the second guiding plate with the third alignment spheres being permanently held between the second securing plate and the second guiding plate.

15. The method of claim 14 wherein:

each of the securing plates comprises a metal portion having fourth alignment apertures and a ceramic portion having fifth alignment apertures;

the securing plates are assembled by contacting to the fifth alignment aperture a fourth alignment sphere that has a smaller diameter than the fifth alignment aperture and a larger diameter than the fourth alignment aperture;

and fitting the metal portion over the fourth alignment ball and bonding together the metal portion and the ceramic portion to make the securing plates.

16. A method for connecting first and second optical fiber bundles, each bundle comprising a plurality of optical fibers comprising the steps of:

making first and second securing plates to respectively contain therein substantially identical arrays of first apertures, each aperture having a diameter sufficiently close to the diameter of an optical fiber to hold in place an end of such optical fiber inserted therein;

aligning the first and second securing plates on a fixture having first and second alignment pins;

simultaneously contacting a first support member to the first securing plate and to the first alignment pin, and bonding the first support member to the first securing plate;

with the first support member in contact with the first alignment pin, contacting a third support member to the first securing plate and to the second alignment pin, and bonding the third support member to the first securing plate;

thereafter, simultaneously contacting a second support member to the first alignment pin and to the second securing plate, and bonding the second support member to the second securing plate;

with the second support member in contact with the first alignment pin, contacting a fourth support member to the second securing plate and to the second alignment pin, and bonding the fourth support member to the second securing plate;

inserting each optical fiber of the first optical bundle into a first aperture of the first securing plate, and inserting each optical fiber of the second optical fiber bundle into a first aperture of the second securing plate;

and simultaneously contacting the first and second support members to a first common alignment pin, thereby to align the first and second optical fiber bundles.

17. The method of claim 16 wherein:

the first common alignment pin is fixed to a first flange that surrounds and is bonded to the first optical fiber bundle;

and the first and second support members simultaneously contact the second alignment pin, the second alignment pin being fixed to a second flange that surrounds and is bonded to the second optical fiber bundle.

18. A method for connecting first and second optical fiber bundles, each bundle comprising a plurality of optical fibers comprising the steps of:

making first and second securing plates to respectively contain therein substantially identical arrays of first apertures, each first aperture having a diameter sufficiently close to the diameter of an optical fiber to hold in place an end of such optical fiber inserted therein;

making first and second guiding plates to respectively contain therein arrays of first apertures which are each substantially identical to the arrays of first apertures in the first and second securing plates;

aligning the first and second securing plates by placing first spheres to contact second apertures of the first and second securing members, the first spheres each having a slightly larger diameter than either of the second apertures it contacts;

aligning the first guiding plate to the first securing plate comprising the step of contacting third alignment apertures of the first guiding plate and the first securing plate with second alignment spheres each having a slightly larger diameter than either of the third alignment apertures it contacts;

aligning the second guiding plate to the second securing plate comprising the step of contacting third alignment apertures of the second guiding plate and second securing plate with third alignment spheres each having a slightly larger diameter than either of the third alignment apertures it contacts;

simultaneously contacting a first support member to the securing plate and to a first alignment pin, and bonding the first support member to the first securing plate;

thereafter, simultaneously contacting a second support member to the first alignment pin and to the second securing plate, and bonding the second support member to the second securing plate;

inserting each optical fiber of the first optical fiber bundle into an aperture of the first guiding plate and into a first aperture of the first securing plate, and inserting each optical fiber of the second optical fiber bundle into an aperture of the second guiding plate and into a first aperture of the second securing plate;

and simultaneously contacting the first and second support members to a first common alignment pin, thereby to align the first and second optical fiber bundles.

* * * * *